(12) United States Patent
Minamii et al.

(10) Patent No.: US 8,884,627 B2
(45) Date of Patent: Nov. 11, 2014

(54) APPARATUS FOR DETECTING SHORT-CIRCUIT OF OUTPUT DIODE IN CONVERTER

(75) Inventors: Toshihiko Minamii, Nisshin (JP); Takahiko Hasegawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 165 days.

(21) Appl. No.: 13/259,972

(22) PCT Filed: Jun. 18, 2009

(86) PCT No.: PCT/JP2009/061103
§ 371 (c)(1),
(2), (4) Date: Sep. 23, 2011

(87) PCT Pub. No.: WO2010/146688
PCT Pub. Date: Dec. 23, 2010

(65) Prior Publication Data
US 2012/0020124 A1 Jan. 26, 2012

(51) Int. Cl.
*G01R 31/08* (2006.01)
*H02J 1/10* (2006.01)
*H02J 3/38* (2006.01)
*H02J 7/34* (2006.01)
*H02H 7/122* (2006.01)
*H02M 3/158* (2006.01)
*H02M 1/32* (2007.01)

(52) U.S. Cl.
CPC ............ *H02H 7/1225* (2013.01); *H02M 3/158* (2013.01); *H02M 1/32* (2013.01)
USPC ............................................ 324/522; 307/18

(58) Field of Classification Search
CPC ......... H02M 1/32; H02M 1/36; H02M 3/155; H02M 3/1588; H02M 2001/0067; H02M 2001/32; H02M 2001/322; H02M 2001/325; H02H 7/10; H02H 7/12; H02H 7/1203; H02H 7/1206; H02H 7/1213; H02H 7/1225; H02H 7/1227; H02H 7/1257
USPC ............. 363/50–58, 56.03–56.11, 65–72, 78, 363/79, 84, 89, 106, 108, 109; 323/271–278, 282–285, 311, 351, 323/222–226; 361/18, 88, 91.1, 91.2, 91.5, 361/90, 91, 92; 307/18–29, 43, 57, 59, 71, 307/75, 76, 82, 84–87, 100; 324/500, 522, 324/537
See application file for complete search history.

(56) References Cited

U.S. PATENT DOCUMENTS

2008/0079409 A1 4/2008 Motomori et al.

FOREIGN PATENT DOCUMENTS

| JP | 11-252917 A | 9/1999 |
|---|---|---|
| JP | 2001-258240 A | 9/2001 |

(Continued)

OTHER PUBLICATIONS

English translation (JP2007043764).*

(Continued)

*Primary Examiner* — Timothy J Dole
*Assistant Examiner* — Carlos Rivera-Perez
(74) *Attorney, Agent, or Firm* — Kenyon & Kenyon LLP

(57) ABSTRACT

An apparatus comprises: a voltage monitoring unit for monitoring input direct-current voltages of first and second converters whose output ends are connected in parallel to each other; and a judgment control unit for judging that an output diode of the first converter is short-circuited, when an input direct-current voltage monitored by the voltage monitoring unit with respect to the first converter rises up to a post-step-up voltage stepped up by the second converter during a step-up operation of the second converter.

2 Claims, 5 Drawing Sheets

(56) References Cited

FOREIGN PATENT DOCUMENTS

| JP | 2006-101565 A | 4/2006 |
| JP | 2007-043764 A | 2/2007 |
| JP | 2007-318938 A | 12/2007 |
| JP | 2008-092617 A | 4/2008 |
| JP | 2008079447 | * 4/2008 |

OTHER PUBLICATIONS

English translation (JP2008079447).*
International Search Report mailed Sep. 15, 2009 of PCT/JP2009/061103.

* cited by examiner

APPARATUS FOR DETECTING SHORT-CIRCUIT OF OUTPUT DIODE IN CONVERTER

This is a 371 national phase application of PCT/JP2009/061103 filed 18 Jun. 2009, the contents of which are incorporated herein by reference.

FIELD OF THE INVENTION

The present invention relates to a technique used in a converter (voltage converter) for converting an input direct-current voltage into a predetermined output direct-current voltage.

BACKGROUND OF THE INVENTION

A DC-DC converter to step up and/or down a direct-current (DC) voltage is known as a voltage converter. The DC-DC converter is used widely in electric devices including an electric circuit, such as a personal computer, an AV device, a portable telephone, a power system, and etc. Recently, there is an example where the DC-DC converter is used in a power system for a vehicle such as a fuel cell vehicle, electric vehicle, hybrid vehicle, etc.

PRIOR ART DOCUMENTS

Patent Document(s)

Patent Document 1: JP2007-318938 A

SUMMARY OF THE INVENTION

Problem to be Solved by the Invention

The DC-DC converter can be configured by, for example, the combination of a switching element such as a transistor etc., a coil (reactor), a condenser, a diode, and etc. If a trouble occurs in an output diode serially-connected to a reactor and then a short-circuit occurs, an electric current may flow backward from the reactor to an input side (direct-current power supply side). The input of such backward current to a direct-current power supply such as a fuel cell may cause the direct-current power supply to be reverse-charged and to be damaged or degraded in performance.

Therefore, an object of the present invention is to enable the detection of short-circuit faults of an output diode. Further, it is also an object of the present invention to enable the prevention of a direct-current power supply being damaged or degraded in performance by preventing the direct-current power supply from being reverse-charged.

Besides the above objects, it may also be listed as one of other objects of the present invention to achieve an operation and effect, which are derived from each configuration illustrated in the embodiments for carrying out the invention described later and not able to be achieved by conventional techniques.

Means for Solving the Problem

One aspect of the apparatus for detecting a short-circuit of output diode in a converter of the present invention is an apparatus for detecting a short-circuit of output diode in a converter, used in a power-supply system that comprises first and second converters capable of stepping up an input direct-current voltage from a direct-current power supply to output a post-step-up voltage via an output diode, wherein the output ends of the first and second converters are connected in parallel to each other, the apparatus comprising: a voltage monitoring unit for monitoring input direct-current voltages of the first and second converters; and a judgment control unit for judging that an output diode of the first converter is short-circuited, when the input direct-current voltage monitored by the voltage monitoring unit with respect to the first converter rises up to a post-step-up voltage stepped up by the second converter during a step-up operation of the second converter.

The judgment control unit herein may stop the step-up operation of the first converter or the first and second converters, when judged that the output diode is short-circuited.

Further, another aspect of the apparatus for detecting a short-circuit of output diode in a converter of the present invention is an apparatus for detecting a short-circuit of output diode in a converter used in a power-supply system that comprises a converter capable of stepping up an input direct-current voltage from a direct-current power supply to output a post-step-up voltage via an output diode, the apparatus comprising: a voltage monitoring unit for monitoring a voltage between both ends of the output diode; and a judgment control unit for judging that, when a difference in the voltage between both ends becomes zero, the output diode is short-circuited.

The judgment control unit herein may stop the step-up operation of the converter, when judged that the output diode is short-circuited.

Advantageous Effects Of The Invention

According to the present invention, it is possible to detect the short-circuit (fault) of an output diode. Furthermore, it is possible to prevent a direct-current power supply from being reverse-charged and thereby to prevent the direct-current power supply from being damaged or degraded in performance.

DESCRIPTION OF EMBODIMENTS

Figure 1:
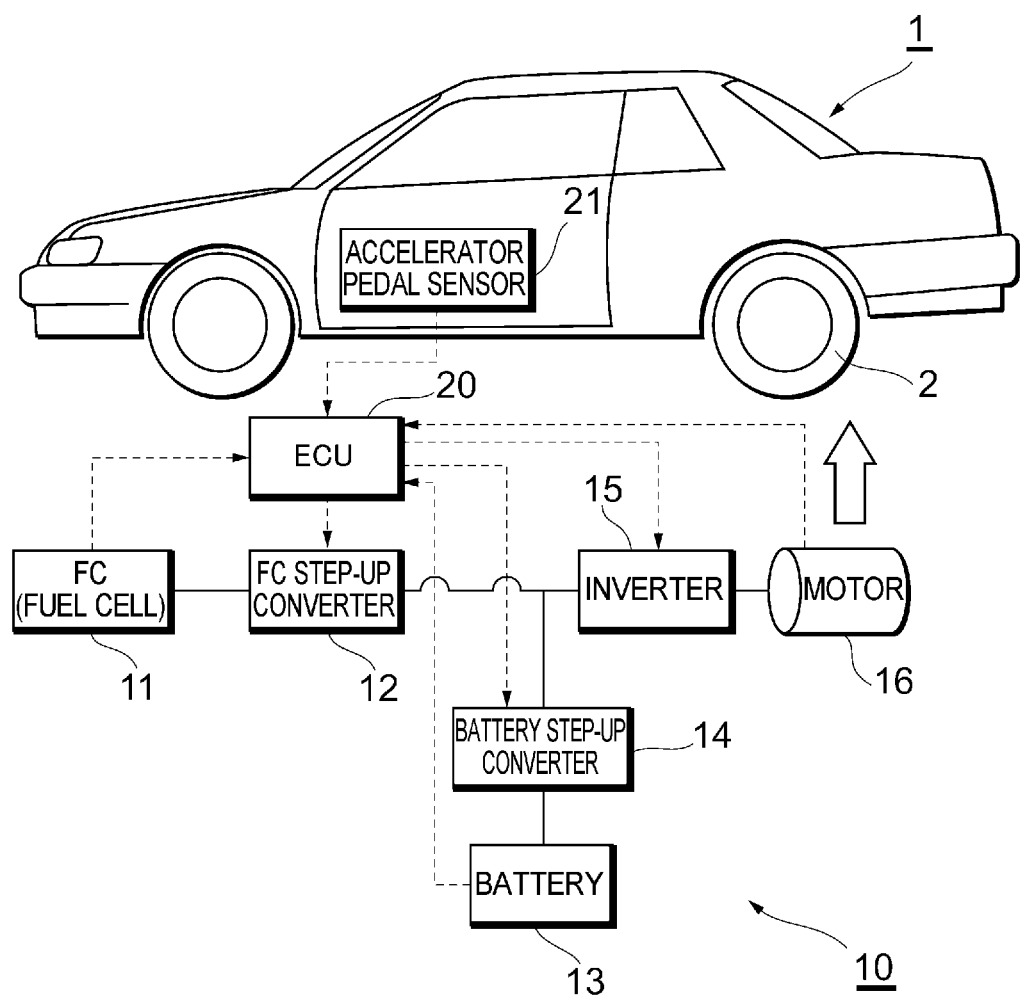
FIG. 1 is a diagram illustrating schematically configuration examples of a power-supply system and a vehicle 1 equipped with the power-supply system according to one embodiment.

Hereinafter, some embodiments of the present invention will be described with reference to the drawings. The embodiments to be described below, however, are merely illustrative and have no intention to exclude the application of various variations and techniques which will not be specified below. More specifically, the present invention can be carried out by variously modifying it (i.e. combining respective embodiments, etc.) without departing from the scope of the invention. Additionally, in the following description of the drawings, the same or similar reference numeral is given to the same or similar component. The drawings, however, are schematic, and do not necessarily correspond to the actual dimension or ratio, etc. There may be included a portion where the relationship or ratio of the mutual dimensions differs among the respective drawings.

FIG. 1 is a diagram illustrating schematically configuration examples of a power-supply system 10 and a vehicle 1 equipped with the power-supply system 10 according to one embodiment.

The power-supply system 10, illustratively, is a fuel cell system comprising a fuel cell (FC) 11, and the vehicle 1 is a fuel cell vehicle, which is an example of electric devices having the fuel cell system 10 as the supply source of a driving electric power. The vehicle 1 may be, however, an electric vehicle or a hybrid vehicle.

The vehicle 1 comprises a motor 16 for driving a driving wheel 2, an electronic control unit (ECU) 20, an accelerator pedal sensor 21 for detecting the opening according to an accelerator pedal, etc. The accelerator pedal sensor 21 is electrically connected to the electronic control unit 20, and, for example, the rotational speed of the motor 16 (the driving wheel 2) is controlled by the ECU 20 in accordance with the detected opening according to the accelerator pedal.

Besides the fuel cell (FC) 11, the fuel cell system 10 comprises, as a non-limiting example, an FC step-up converter 12, a battery 13, a battery step-up converter 14, an inverter 15, etc. The FC step-up converter 12 is an example of a first converter to step up an input DC voltage, and the battery step-up converter 14 is an example of a second converter to step up an input DC voltage.

The FC 11 is a device to generate electric power by utilizing an electrochemical reaction. Various types of fuel cells, including a polymer electrolyte type, a phosphoric acid type, a molten carbonate type, a solid oxide type, an alkaline electrolyte type, etc., are applicable to the FC 11. The electric power generated by the FC 11 is used for the driving electric power of the motor 16 which drives the driving wheel 2 of the vehicle 1 and for the charge of the battery 13.

The battery 13 is a secondary battery capable of being charged/discharged, and various types of secondary batteries, including a lithium ion type, a nickel-hydrogen type, a nickel-cadmium type, etc., are applicable to the battery 13. The battery 13 can supply electric power to various electric devices used in operating the vehicle 1 or the FC 11. The electric device described herein includes: a lighting equipment, an air-conditioning equipment, and a hydraulic pump of the vehicle 1; and a pump for supplying a fuel gas or the reformed material thereof, and a heater for adjusting the temperature of a reforming device of the FC 11, etc.

As illustrated in FIG. 1, the FC 11 and battery 13 are electrically connected to the inverter 15 in parallel. The FC step-up converter 12 is provided in an electric path extending from the FC 11 to the inverter 15. The FC step-up converter 12 is a DC-DC converter for stepping up an input DC voltage and is capable of converting (for example, stepping up) a DC voltage generated in the FC 11 into a predetermined DC voltage within a convertible range thereof to apply such DC voltage to the inverter 15. Such step-up operation allows securing a driving electric power to be required for driving the motor 16, even if the output power of the FC 11 is low.

Meanwhile, the battery step-up converter 14 is connected to an electric path extending from the battery 13 to the inverter 15 in parallel with respect to the electric path between the FC step-up converter 12 and the inverter 15. The converter 14 is also a DC-DC converter and is capable of converting a DC voltage applied from the battery 13 or the inverter 15 into a predetermined DC voltage within a convertible range thereof.

A step-up-and-down converter, which is capable of both stepping up and down a voltage, can be applied to the converter 14. It is thus possible, for example, to control (step up) an input DC voltage from the battery 13 to output such input DC voltage to the inverter 15 and to control (step down) an input DC voltage from the FC 11 or the motor 16 to output such input DC voltage to the battery 13, thereby allowing the battery 13 to be charged/discharged.

Further, the converter 14 is controlled its output voltage, and thereby is capable of controlling the terminal voltage of the inverter 15. The control controls a relative output voltage difference between respective power supplies (the FC 11 and the battery 13) connected to the inverter 15 in parallel, and thereby makes possible to appropriately use the electric powers of both power supplies separately.

The inverter 15 receives the input of a DC voltage from the FC 11 through the converter 12, and from the battery 13 through the converter 14, then converts such input DC voltage into an alternating-current (AC) voltage, and thus supplies such alternating-current voltage as a driving voltage for the motor 16. Meanwhile, the ECU 20 controls the operation (switching) of the inverter 15 such that an AC voltage according to a demanded power is supplied to the motor 16.

The ECU 20 generally controls, in addition to the above-described controls, the operation (drive) of the vehicle 1 and the fuel cell system 10. The ECU 20 can be realized as, illustratively, a microcomputer equipped with a CPU that is an example of arithmetic processing units, a RAM and a ROM that are examples of storage devices, etc. The ECU 20 is electrically connected to the motor 16, each component of the fuel cell system 10, and various sensors, and thereby appropriately performs receiving various sensor values, arithmetic processing, transmitting instructions (control signals), etc. The sensors may include, besides the accelerator pedal sensor 21, an SOC sensor to detect the state of charge (SOC) of the battery 13, a vehicle speed sensor to detect a vehicle speed (the number of revolutions of the motor 16), a voltage sensor and a current sensor provided to the step-up converter 12 (14), which voltage sensor and current sensor will be described later, etc.

(Step-up converters 12 and 14)

Figure 2:
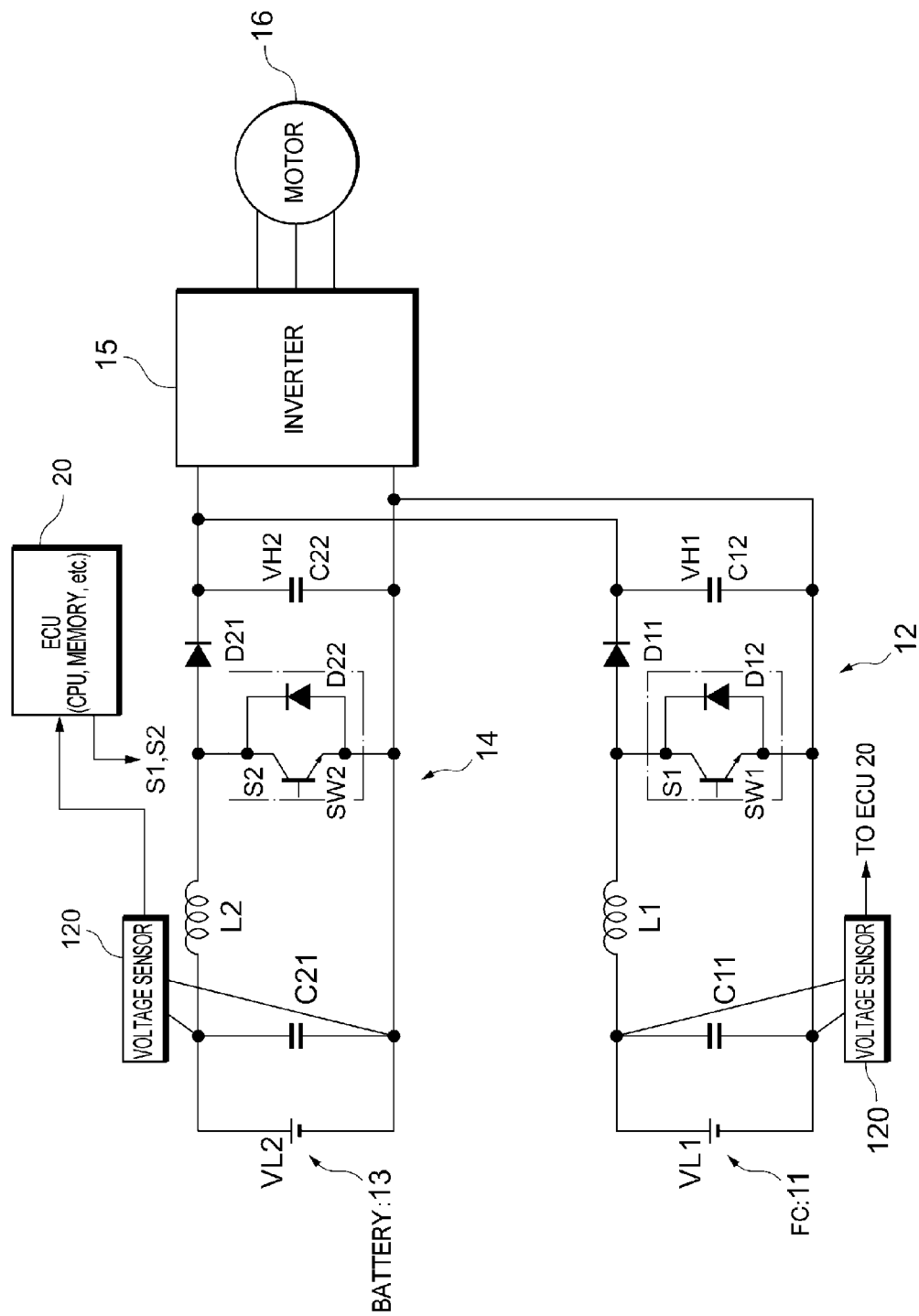
FIG. 2 is a diagram illustrating one example of an FC step-up converter and battery step-up converter depicted in FIG. 1.

Next, an example of an electric circuit diagram of the step-up converters 12 and 14 is depicted in FIG. 2. As depicted in FIG. 2, the step-up converter 12 comprises, illustratively: a reactor (coil) L1; an (output) diode D11; condensers C11 and C12; and a switching circuit SW1 having a switching element S1 and an (antiparallel) diode D12. The step-up converter 14 also comprises, illustratively: a reactor (coil) L2; an (output) diode D21; condensers C 21 and C22; and a switching circuit SW2 having a switching element S2 and an (antiparallel) diode D22.

Note that, in FIG. 2, VL1 represents the input voltage (pre-step-up voltage) of the FC step-up converter 12 and VH1 (≥VL1) represents the output voltage (post-step-up voltage) of the aforementioned converter 12, respectively. Further, VL2 represents the input voltage (pre-step-up voltage) of the battery step-up converter 14 and VH2 (≥VL2) represents the output voltage (post-step-up voltage) of the battery step-up converter 14, respectively. VL1 and VL2 may be the same voltage or different voltages. The same holds true for VH1 and VH2.

As a non-limiting example, an insulated gate bipolar transistor (IGBT) is applicable to the switching element S1 (S2) of the step-up converter 12 (14).

In the step-up converter 12 (14), the reactor L1 (L2) is connected at its one end to the high-potential side of the FC 11 (the battery 13), which is a direct-current power supply, in series, and also connected at its other end to the anode of the output diode D11 (D21) in series.

The one end of the input condenser C11 (C21) is connected between the reactor L1 (L2) and the FC 11 (the battery 13), the other end of the input condenser C11 (C21) is connected to the low-potential side (for example, ground) of the FC 11 (the battery 13), and the output voltage VL1 (VL2) of the FC 11 (the battery 13) is applied to the both ends as an input voltage. The condenser C11 (C21) smoothes the output current of the FC 11 (the battery 13) to serve as an input smoothing condenser to reduce ripples.

The collector of the switching element S1 (S2) is connected between the reactor L1 (L2) and the output diode D11 (D21), and the emitter of the switching element S1 (S2) is connected to the low-potential side of the FC 11 (the battery 13). Further, the cathode of the antiparallel diode D12 (D22) is connected to the collector of the switching element S1 (S2), and the anode of the diode D12 (D22) is connected to the emitter of the switching element S1 (S2).

The one end of the output condenser C12 (C22) is connected to the cathode of the output diode D11 (D21), and the other end of the output condenser C12 (C22) is connected to the low-potential side of the FC 11 (the battery 13). The output condenser C12 (C22) smoothes the output current supplied from the output diode D11 (D21) through the inverter 15 to the motor 16 to serve as an output smoothing condenser which reduces ripples. A voltage between both ends VH1 (VH2) of the output condenser C12 (C22) corresponds to a post-step-up voltage.

The switching element S1 (S2) is such that its gate voltage is periodically ON/OFF-controlled, for example, from the ECU 20. As a non-limiting example, the period (carrier frequency) of the switching is about 100 ms (100 kHz).

During the period in which the switching element S1 (S2) is ON, the output current of the FC 11 (the battery 13) returns through the reactor L1 and the switching element S1 (S2) to the low-potential side of the FC 11 (the battery 13), and thus electric energy is accumulated in the reactor L1 (L2). On the other hand, during the period in which the switching element S1 (S2) is OFF, the electric energy accumulated in the reactor L1 (L2) up to that time is superimposed on the output voltage of the FC 11 (the battery 13) and then output through the output diode D11 (D21).

In such manner, the step-up converter 12 (14) can step up the input DC voltage VL1 (VL2) from the FC 11 (the battery 13) to the output DC voltage VH1 (VH2) and then output the post-step-up voltage VH1 (VH2) through the output diode D11 (D21).

(Detection of short-circuit fault in the output diode D11 (D12))

Assumed is a case where, in a two-converter system in which two step-up converters 12 and 14 are connected to the inverter 15 (the motor 16) in parallel as described above, as depicted in FIG. 3, during the driving (during the step-up operation) of one step-up converter 14, the output diode D11 of the other converter 12 is short-circuited and then at fault due to some sort of trouble. Note that, it does not matter whether the other converter is driving or not driving (standby). Furthermore, for descriptive purposes, it is assumed that: VL1=VL2=VL; and VH1=VH2=VH.

In such case, both ends of the output diode D11 have been short-circuited in the step-up converter 12, therefore, a voltage VH being stepped up by the step-up converter 14 in normal operation is applied to the input condenser C11. Thus, a voltage between both ends of the input condenser C11 rises to the VH, and then becomes higher than the output voltage VL of the FC 11. As a result, an electric current flowing backward (reverse current) to the FC 11 side is generated. When the FC 11 is reverse-charged by such reverse current, the FC 11 may be damaged or degraded in performance. Note that the same holds true for the case where the output diode D21 of the step-up converter 14 has a short-circuit fault.

Therefore, in the present embodiment, voltages between both ends of the condensers C11 and C21, which are the input voltages (VL) of the step-up converters 12 and 14, are detected (monitored) by the voltage sensors 120, respectively. The voltage sensor 120 is an example of a voltage monitoring unit for monitoring the input DC voltages of the step-up converter 12/14. The voltage sensors 120 are electrically connected to, for example, the ECU 20, and can provide respective voltage sensor values to the ECU 20.

The ECU 20 periodically judges whether or not a voltage sensor value from any of the voltage sensors 120 exceeds a predetermined threshold value (for example, maximum allowable voltage value for VL), and if exceeded, the ECU 20 judges that the output diode D11 or D21 in the step-up converter 12 or 14 corresponding to the voltage sensor 120 from which such voltage sensor value is received is short-circuited. The threshold value can be stored in, for example, a memory in the ECU 20.

In other words, the ECU 20 serves as an example of a judgment control unit for judging that, when, during the step-up operation of one step-up converter 14, an input DC voltage (the output DC voltage of the FC 11) detected by the voltage sensor 120 with respect to the other step-up converter 12 rises up to a post-step-up voltage VH stepped up by the step-up converter 14, the output diode D11 of the other step-up converter 12 is short-circuited.

Figure 3:
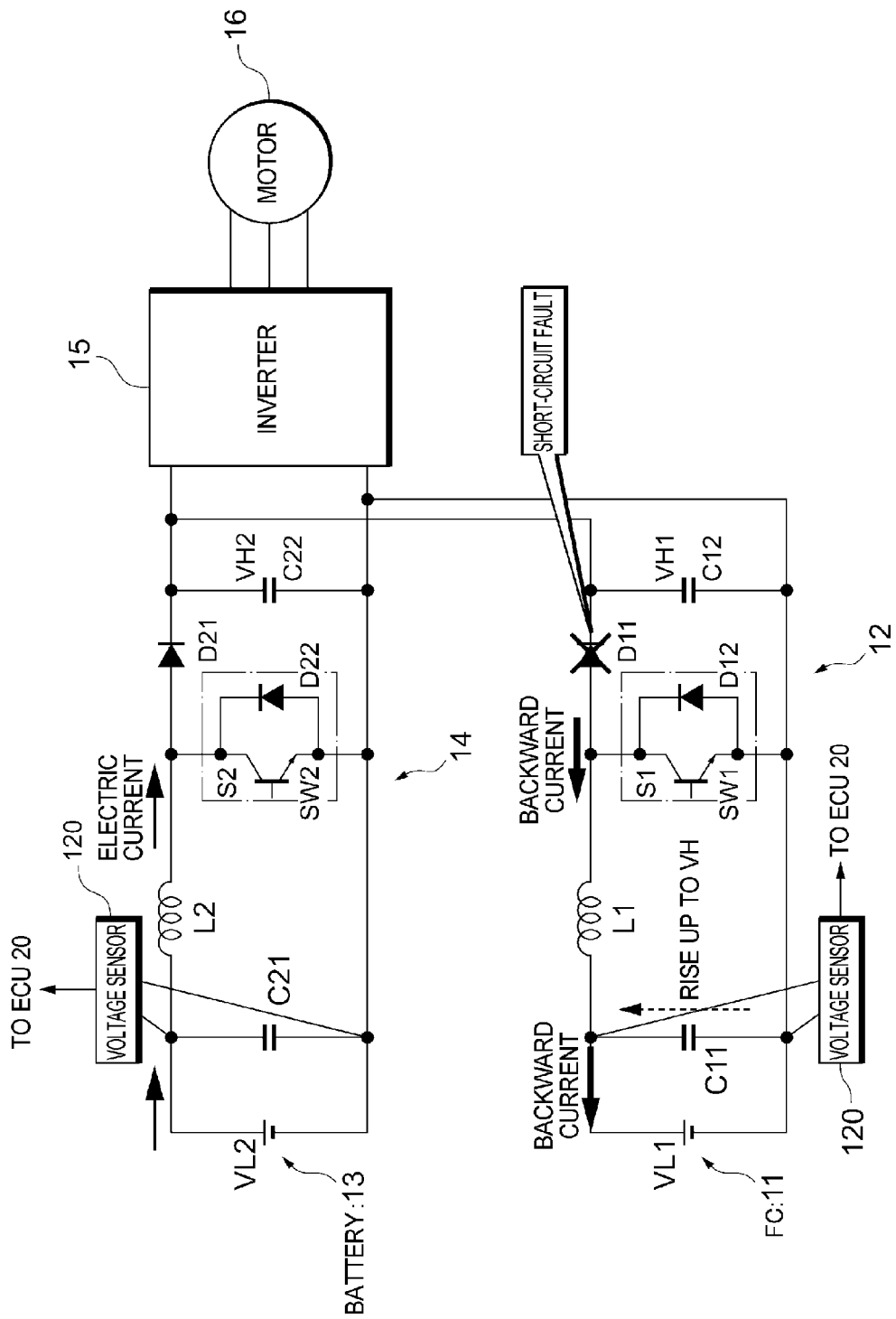
FIG. 3 is a diagram illustrating an example of an operation in a case where a short-circuit fault of the output diode occurs in the configuration depicted in FIG. 2.

In such situation, as depicted in FIG. 3, if the switching element S1 is turned ON in the state where the output diode D11 is short-circuited in the step-up converter 12 in which a short-circuit fault has occurred, an electric path to which the post-step-up voltage VH stepped up by the step-up converter 14 is applied will be short-circuited. Thus, an overcurrent which exceeds a rated current would possibly flow into such switching element S1.

Therefore, if the ECU 20 judges that the output diode D11 has a short-circuit fault, it controls such that the switching element S1 of the step-up converter 12 in which a sort-circuit fault has occurred is turned OFF, to stop the driving (step-up operation) of such step-up converter 12. Thus, it is possible to prevent a damage or the like due to an overcurrent flowing into the switching element S1 from occurring.

Note that, even when the switching element S1 of the step-up converter 12 in which a short-circuit fault has occurred is in an OFF state, the input voltage VL of such step-up converter 12 rises in response to the step-up operation of the step-up converter 14 in which a short-circuit fault has not occurred. Therefore, in both cases: where the step-up converter 12 in which a short-circuit fault has occurred is originally not driving (on standby); and where an overcurrent protection function works during the driving of such step-up converter 12 so that the switching element S1 is turned OFF, the ECU 20 can judge and detect the abnormal short-circuit of the output diode D11 based on a voltage sensor value obtained by the voltage sensors 120, as long as the other step-up converter 14 is driving normally.

When the short-circuit fault of the output diode D11 is detected, the ECU 20 may control, additionally, such that the switching element S2 of the normally driving step-up converter 14 is also turned OFF. The step-up operation of the entire power-supply system 10 is thus stopped, and therefore a situation where the power-supply system 10 falls into a system-wide failure due to the short-circuit fault of a part of the output diode D11 can be avoided (i.e. a fail-safe system can be achieved).

Note that, there may be a case where a current flowing backward to the FC 11 or the battery 13 side is generated by a counter electromotive force which occurs in the motor 16. Therefore, if, for example, the number of revolutions of the motor 16 is greater than or equal to a certain value and there is a possibility that a certain level of counter electromotive force occurs, the ECU 20 may perform a field-weakening control with respect to the motor 16 such that a regenerative current to be generated by such counter electromotive force is suppressed. Thus, even if a short-circuit fault occurs in the step-up converter 12 or 14, the power-supply system 10 can be protected from a regenerative current caused by the counter electromotive force of the motor 16.

Note that, also in a case where, in contrast to the above example, the output diode D21 of the step-up converter 14 has a short-circuit fault, such short-circuit fault can be detected by the ECU 20 in the same manner as above.

(Variation 1)

Figure 4:
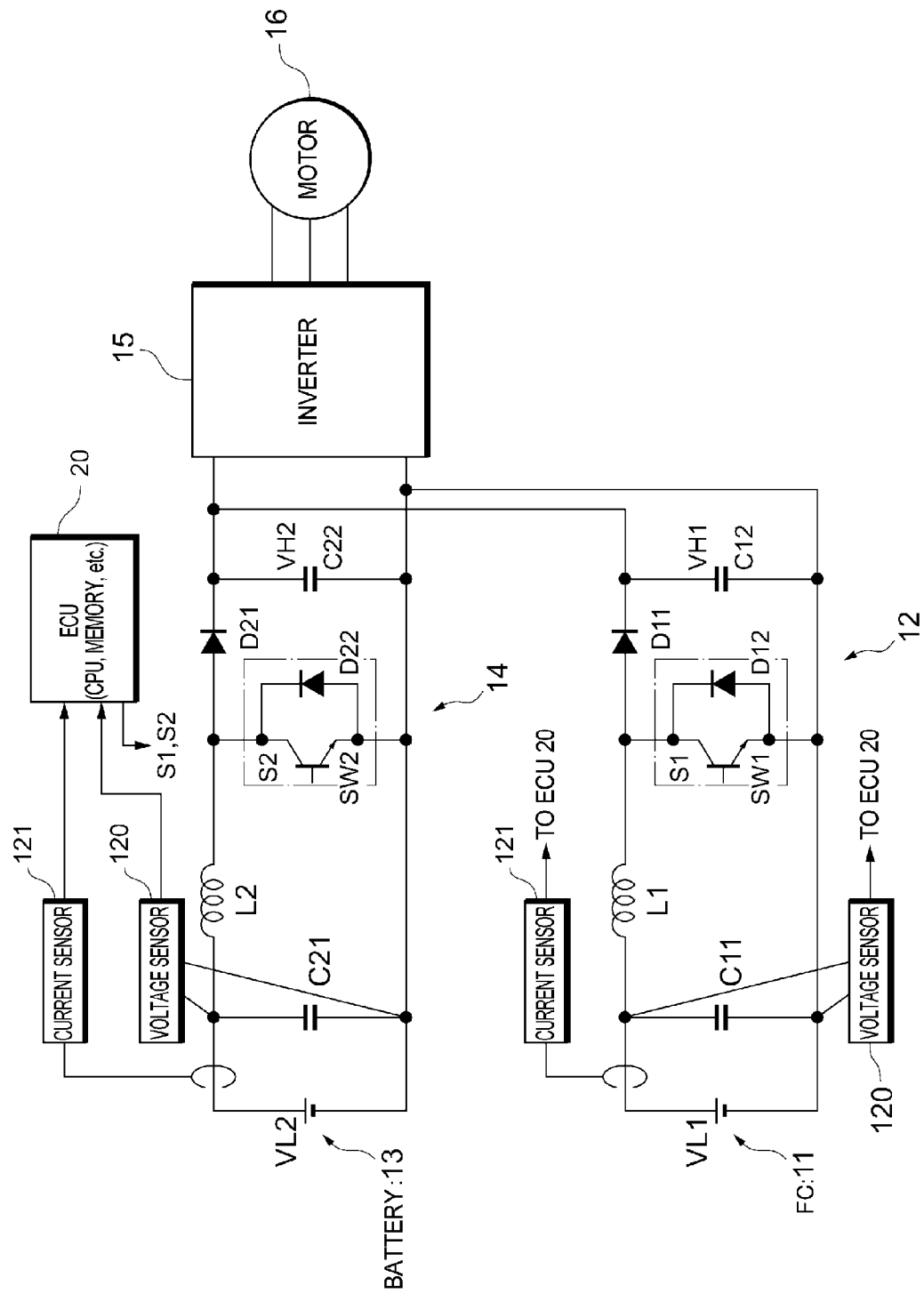
FIG. 4 is a diagram illustrating a variation of the configuration depicted in FIG. 2.

As depicted in FIG. 4, in the step-up converter 12 (14), a current sensor 121 can be, additionally, provided between the direct-current power supply 11 (13) and the input condenser 011 (021) or, alternatively, between the connecting point of the input condenser 011 (021) and the input condenser 011 (021), as an example of a current detection unit for detecting the amount of current at such locations. There may be a case where the current sensor 121 is originally provided, for the purpose of controlling the average amount of current flowing from the direct-current power supply 11 (13) to the reactor L1 (L2) at the time of the step-up operation.

Illustratively, a magnetic proportion type sensor is applicable to the current sensor 121. A magnetic proportion type current sensor measures indirectly the magnitude of electric current by measuring a magnetic field at a time when the current to be measured flows through a conductor. For example, a magnetic field according to a current is converted into a voltage signal by a hall element, such output voltage is amplified by an amplifier circuit, and then the output voltage according to the current is output as a sensor value.

Illustratively, the current sensor 121 is electrically connected to the

ECU 20, and is capable of providing the detected current value (current sensor value) to the ECU 20. In such case, the ECU 20 can use, in addition to a voltage sensor value from the voltage sensor 120, a current sensor value from the current sensor 121 for the short-circuit abnormality judgment on the output diode D11 (D21).

For example, when both the voltage sensor value and the current sensor value satisfy a predetermined judgment condition (illustratively, when each sensor value exceeds each corresponding threshold value), the ECU 20 can judge that the output diode D11 or D 21 of the corresponding step-up converter 12 or 14 has a short-circuit fault. Thus, the accuracy of a short-circuit fault judgment can be improved.

(Variation 2)

Figure 5:
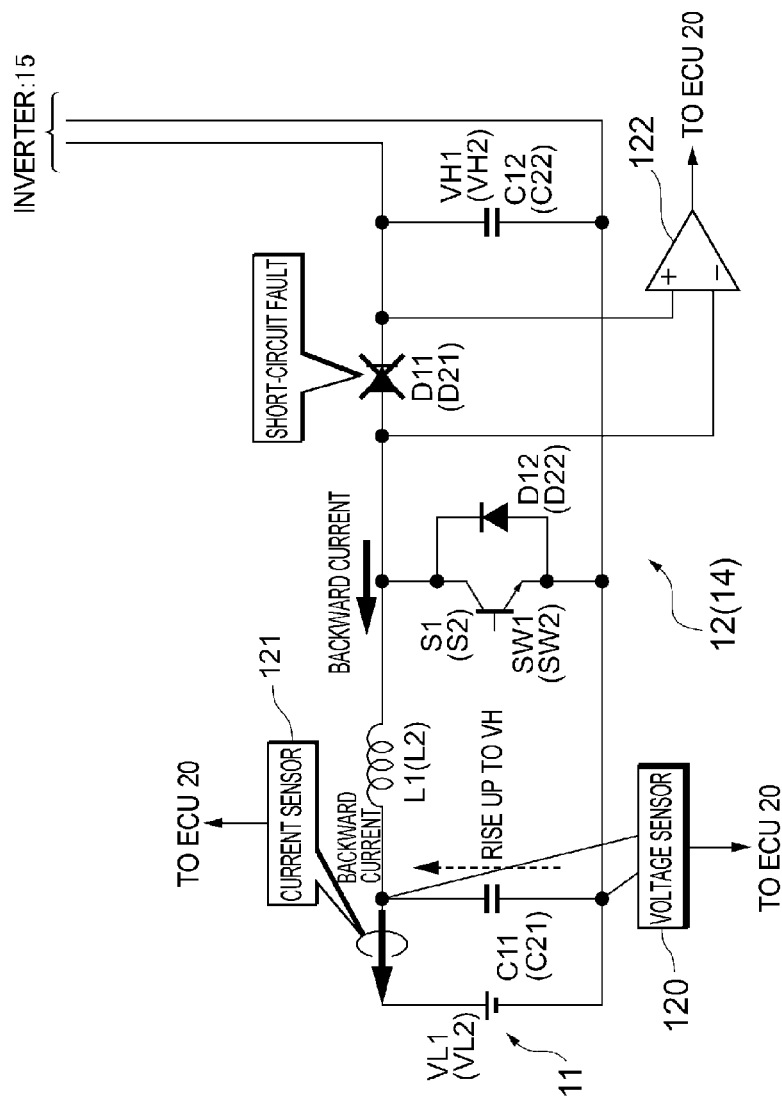
FIG. 5 is a diagram illustrating another variation of the configuration depicted in FIG. 2.

The short-circuit fault judgment of the output diode D11 (or D21) described above may be performed by monitoring a voltage between both ends of the output diode D11 (or D21). For example, as depicted in FIG. 5, a comparator 122 is provided at both ends of the output diode D11. The comparator 122 is an example of a voltage monitoring unit for monitoring a voltage between both ends of the output diode D11, and, for example, the comparator 122 is electrically connected to the ECU 20, and thereby is capable of providing a comparison result in the comparator 122 to the ECU 20. Note that, not shown in FIG. 5, however, a comparator 122 may also be provided to the output diode D21 of the step-up converter 14.

The ECU 20 is another example of the judgment control unit, and is capable of judging that the output diode D11 (or D21) has a short-circuit fault, when a comparison result in the comparator 122, namely, the difference in voltage between both ends of the output diode D11 (or D21) becomes zero.

In this example, even when a plurality of step-up converters 12 and 14 are not connected in parallel as in the embodiment described above, as long as the step-up converter 12 or 14 provided with the comparator 122 is in a step-up operation, it is possible to judge that a short-circuit fault has occurred from the difference in voltage between both ends of the output diode D11 (or D21) becoming zero. In contrast to this, when the step-up converters 12 and 14 are connected in parallel as in the embodiment described above, a short-circuit fault judgment can be performed as long as any one of the step-up converters 12 and 14 is in a step-up operation.

Note that the voltage sensor 120 and/or current sensor 121 described above may additionally be provided with respect to each of the step-up converters 12 and 14. In such case, the ECU 20 judges and detects the short-circuit fault of the output diode D11 or D21 based on a comparison result in the comparator 122 and the combination of a voltage sensor value and/or a current sensor value, and thus the improvement of judgment/detection accuracy can be achieved.

(Others)

The above-described embodiments may be applied to other kinds of converters such as a resonant DC-DC converter, etc. Furthermore, the above-described embodiments may be applied to, not only a vehicle-mounted DC-DC converter, but also a DC-DC converter mounted to an electric device such as a personal computer, an audio-visual (AV) device, a mobile terminal.

DESCRIPTION OF REFERENCE SYMBOLS 1 vehicle
2 driving wheel
10 power-supply system (fuel cell system)
11 fuel cell (FC)
12 FC step-up converter
13 battery
14 battery step-up converter
15 inverter
16 motor
20 electronic control unit (ECU) (judgment control unit)
21 accelerator pedal sensor
120 voltage sensor (voltage monitoring unit)
121 current sensor
122 comparator (voltage monitoring unit)
C11,C12,C21,C22 condenser
D11,D12,D21,D22 diode
L1,L2 reactor (coil)
S1,S2 switching element
SW1,SW2 switching circuit

What is claimed is:

1. An apparatus for detecting a short-circuit of output diode in a converter, used in a power-supply system that comprises first and second converters capable of stepping up an input direct-current voltage from a direct-current power supply to output a post-step-up voltage via an output diode, wherein the output ends of the first and second converters are connected in parallel to each other, the apparatus comprising:

a first voltage monitoring unit configured to monitor input direct-current voltage of the first converter;

a second voltage monitoring unit configured to monitor a post-step-up voltage of the second converter; and a judgment control unit configured to judge that an output diode of the first converter is short-circuited, when the input direct-current voltage monitored by the first voltage monitoring unit rises up to the post-step-up voltage stepped up by the second converter during a step-up operation of the second converter, measured by the second voltage monitoring unit.

2. The apparatus for detecting a short-circuit of output diode in a converter according to claim 1, wherein, when judged that the output diode is short-circuited, the judgment control unit stops the step-up operation of the first converter or the first and second converters.

* * * * *

UNITED STATES PATENT AND TRADEMARK OFFICE
CERTIFICATE OF CORRECTION

| | |
|---|---|
| PATENT NO. | : 8,884,627 B2 |
| APPLICATION NO. | : 13/259972 |
| DATED | : November 11, 2014 |
| INVENTOR(S) | : Toshihiko Minamii et al. |

Page 1 of 1

It is certified that error appears in the above-identified patent and that said Letters Patent is hereby corrected as shown below:

In the Specification,

At column 7, line 25, change "011 (021)" to -- C11 (C21) --.

At column 7, line 26, change "011 (021)" to -- C11 (C21) --.

At column 7, lines 26-27, change "011 (021)" to -- C11 (C21) --.

Signed and Sealed this
Fourth Day of August, 2015

Michelle K. Lee
*Director of the United States Patent and Trademark Office*